United States Patent
Ihara et al.

(10) Patent No.: US 6,585,222 B2
(45) Date of Patent: Jul. 1, 2003

(54) VIBRATION ISOLATING DEVICE

(75) Inventors: Yoshio Ihara, Osaka (JP); Hironori Kato, Osaka (JP)

(73) Assignee: Toyo Tire and Rubber Co. Ltd., Osaka (JP)

( * ) Notice: Subject to any disclaimer, the term of this patent is extended or adjusted under 35 U.S.C. 154(b) by 0 days.

(21) Appl. No.: 09/941,262

(22) Filed: Aug. 28, 2001

(65) Prior Publication Data

US 2002/0063196 A1 May 30, 2002

(30) Foreign Application Priority Data

Sep. 20, 2000 (JP) ........................................ 2000-285580
Aug. 24, 2001 (JP) ........................................ 2001-255206

(51) Int. Cl.⁷ ............................................. F16M 13/00
(52) U.S. Cl. .................... 248/562; 248/308; 248/632; 248/659; 267/140.11; 267/140.12; 267/219
(58) Field of Search ................. 248/608, 609, 248/620, 621, 659, 632, 634, 638, 562, 575, 894; 267/219, 140.11, 140.13, 154, 153, 152

(56) References Cited

U.S. PATENT DOCUMENTS

| 4,717,111 A | * | 1/1988 | Saito ............................ 248/659 |
| 4,840,357 A | * | 6/1989 | Jouade .................... 267/140.12 |
| 4,840,359 A | * | 6/1989 | Hamaekers et al. ... 267/140.12 |
| 4,927,123 A | * | 5/1990 | Schwerdt ................ 267/140.12 |
| 5,024,425 A | * | 6/1991 | Schwerdt ...................... 180/312 |
| 5,096,166 A | * | 3/1992 | Schwerdt ................ 267/140.12 |
| 5,123,634 A | * | 6/1992 | Schwerdt ................ 267/140.12 |
| 5,178,376 A | * | 1/1993 | Hamaekers et al. ... 267/140.11 |
| 5,944,297 A | * | 8/1999 | Flower et al. .............. 248/632 |

FOREIGN PATENT DOCUMENTS

| JP | 6-264967 | | 9/1994 |
| JP | 10-205561 | | 8/1998 |
| JP | 11-159553 | * | 6/1999 |
| JP | 2000-9166 | | 1/2000 |

* cited by examiner

Primary Examiner—Ramon O Ramirez
Assistant Examiner—Tan Le
(74) Attorney, Agent, or Firm—Jordan and Hamburg LLP

(57) ABSTRACT

In a vibration isolator wherein an inner and an outer cylindrical fittings are connected by a rubber elastomer between both fittings; in the rubber elastomer above and below the inner cylindrical fitting, hollow spaces are formed circumferentially in a larger width, in a cross-section square to the axial direction, than an outside diameter of the inner cylindrical fitting; and lateral portions as support arms of the rubber elastomer between the hollow spaces support the inner cylindrical fitting to the outer cylindrical fitting, in order to lower the dynamic spring rate in the lateral direction square to the axial direction and facilitate the tuning of rigidity, without changing the vibration-isolating characteristics in the vertical direction and without deteriorating the durability, small vacancies are provided in the lateral portions at a distant position inboard from the outer cylindrical fitting.

8 Claims, 5 Drawing Sheets

VIBRATION ISOLATING DEVICE

BACKGROUND OF THE INVENTION

1. Field of the Invention

This invention relates to a vibration-isolating device mainly used for automobile engine mounts, suspension bushings, etc.

2. Description of the Related Art

Bush type of vibration isolators for use in vehicle engine mounts, suspension bushings, etc. have heretofore been known, in which an inner cylindrical fitting and an outer cylindrical fitting are connected by a rubber elastomer interposed between them. Usually the inner cylindrical fitting is attached, through a shaft member inserted therein, to the one support member whereas the outer cylindrical fitting is press fitted in the other support member such as bracket, etc., whereby the vibration isolator is fixed. These support members are fitted on the vibration source side, e.g., power unit such as engine and on the support side such as vehicle body.

The vibration isolators of this kind is, as shown in FIG. 10, typically constructed so that an inner cylindrical fitting 51 and an outer cylindrical fitting 52 are connected by a rubber elastomer 53 interposed between both fittings 51, 52, in the rubber elastomer 53 there are defined hollow spaces 54, 55 having circumferentially a required width so as to oppose to each other above and below the inner cylindrical fitting 51, and the rubber elastomer 53 between the hollow spaces 54, 55 supports at its lateral portions 53a, 53b the inner cylindrical fitting 51 relative to the outer cylindrical fitting 52.

The design of this vibration isolator is based on that for instance, where it is used to restrain the fore-and-aft vibration of the power unit, with its axial direction (X-direction) oriented in a lateral direction to the vehicle, the spring in the up-and-down direction (Z-direction) to the fore-and-aft direction (Y-direction), which is the lateral direction square to the axial direction, is soft and flexible because of the upper and lower hollow spaces 54, 55, whereby predetermined vibration-isolating characteristics required for the vertical vibration are available.

In the preceding example of vibration isolator, in particular with such a construction that, in the state of use, supports the inner cylindrical fitting 51 at lateral portions 54, 55 of the rubber elastomer 53, the dynamic spring rate in the fore-and-aft direction is high as compared to the vertical (up-and-down) direction and consequently, the vibration-isolating performance to the vibration in the fore-and-aft direction is too inferior and the volumes of the lateral portions 53a, 53b are too larger to be satisfactory. That is, the input of vibration load in the vertical direction causes high compression stress and tensile stress to the lateral portions 53a, 53b. As a result, heat is evolved at the lateral portions and it is likely that breakdown or cracks develop, which deteriorates the durability. Therefore it is desired to lower the dynamic spring rate in the fore-and-aft direction.

For instance, if the form of the hollow space and the configuration of the aforementioned lateral portions are altered in order to lower the dynamic spring rate of the lateral portions in the fore-and-aft direction, which is the lateral direction square to the axis, the spring in the up-and-down direction and vibration isolating characteristics or other characteristics are affected thereby. Consequently, the required performance cannot be achieved, the durability is deteriorated, and besides, the tuning of rigidity becomes difficult.

The present invention has been made in view of the problems described above, and it is a principal object of the invention to provide a vibration-isolating device capable of reducing the dynamic spring rate mainly in the lateral direction square to the axial direction, namely the fore-and-aft direction and tuning easily the rigidity without altering the vibration-isolating characteristics and without deteriorating the durability.

SUMMARY OF THE INVENTION

This invention relates to a vibration isolating device which comprises an inner cylindrical fitting, an outer cylindrical fitting disposed outside to surround the inner cylindrical fitting, and a rubber elastomer interposed between the inner and outer cylindrical fittings, the rubber elastomer having therein circumferentially hollow spaces defined above and below the inner cylindrical fitting, the hollow spaces extending in a larger width, in the cross-section square to the axial direction, than the outside diameter of the inner cylindrical fitting, the rubber elastomer between the upper and lower hollow spaces constituting lateral portions, the lateral portions serving to support the inner cylindrical fitting to the outer cylindrical fitting; and which is characterized in that the lateral portions of the rubber elastomer are defined axially with small vacancies spaced apart inboard of the outer cylindrical fitting.

The vibration isolation device of this invention is thus provided axially with small vacancies at the lateral sides of the rubber elastomer, thereby making it possible to reduce the dynamic spring rate in the lateral direction square to the axial direction without altering the form of the hollow spaces and the contour of lateral portions and without affecting the dynamic spring rate and vibration isolating characteristics in the up-and-down direction. On account of the advantage, for example, where it is used with the axial direction oriented in the lateral direction to the vehicle, vibration-isolating characteristics in the fore-and-aft direction can be improved.

The small vacancies are provided at a distant position from the outer cylindrical fitting and as such it is possible to inhibit the evolution of heat in the rubber elastomer, which is ascribed to the vibration in the lateral direction square to the axial direction, by heat dissipation effect due to the small vacancies, thus preventing the deterioration in durability.

In particular, where the small vacancies are provided in the vicinity of the midpoint between the inner and outer cylindrical fittings in the lateral portions of the rubber elastomer, evolution of heat can be inhibited effectively because the vicinity of the midpoint is large in compression and tensile movements owing to the input of vibrational load in the lateral direction square to the axial direction and accordingly, is most liable to evolve heat.

In the preceding vibration isolation device, the small vacancies are either non-through-holes or through-holes. In either case, tuning of the rigidity is easy and feasible as compared with the case where no small vacancies are provided.

In particular, where the small vacancies are not through-holes, the rigidity is set higher than the case of through-holes owing to the existence of the non-pierced portion, and the tuning of rigidity becomes easy by varying and adapting the diameter of the non-through-holes, the depth of the holes, and accordingly, the wall thickness of the non-pierced portion. The design freedom is thus expanded.

In accordance with this invention it is also possible to provide each of the lateral portions of the rubber elastomer with a plurality of small vacancies. In this case, it is likewise possible to restrain further effectively the heat evolution at the lateral portions owing to heat dissipation effect of the small vacancies and to facilitate the tuning of rigidity.

In the preceding vibration-isolating device, the inner cylindrical fitting is preferred to be disposed eccentric upwardly to the outer cylindrical fitting under non-loading condition so as to be supported nearly concentrically under a predetermined load, whereby its vibration-isolating characteristics are stabilized.

Alternatively it is possible to construct so that the outer cylindrical fitting has a laterally long ellipsoidal shape in cross-section and the lateral portions of the rubber elastomer support the inner cylindrical fitting from both lateral sides in cross-section of the outer cylindrical fitting. By doing so, in case where the axial direction of the vibration-isolating device is oriented in the lateral direction, a long ellipsoidal shape in the fore-and-aft direction in cross-section is resulted, and as a result, the inner cylindrical fitting can be supported by a sufficient volume of the rubber elastomer from both sides in the fore-and-aft direction, stabilizing further the vibration-isolating characteristics.

DESCRIPTION OF PREFERRED EMBODIMENTS

Figure 1:
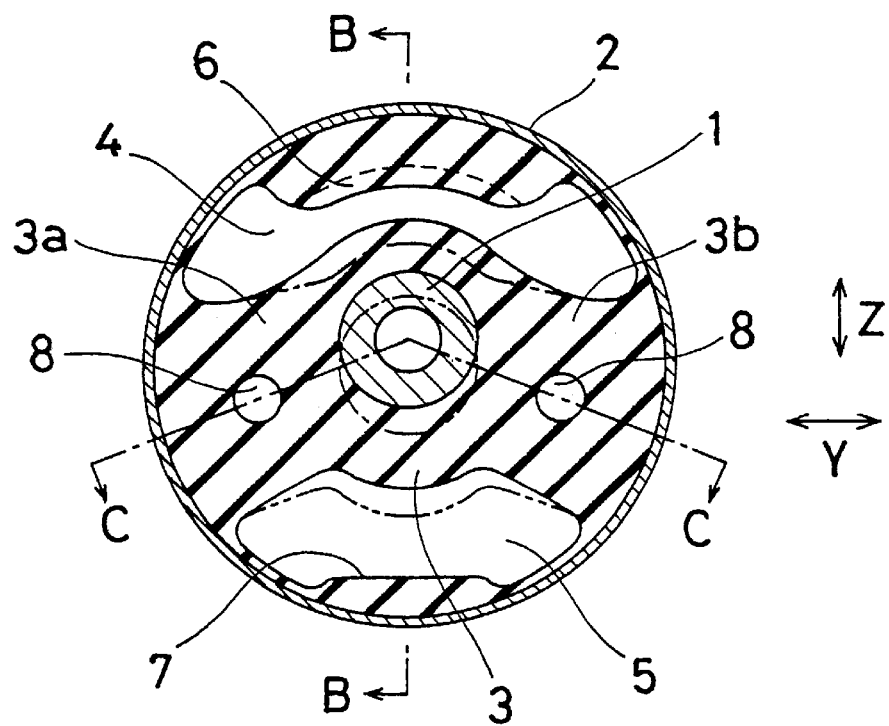
FIG. 1 is a sectional view taken on the line A—A in FIG. 2 showing one example of vibration-isolating device of this invention.
Figure 2:
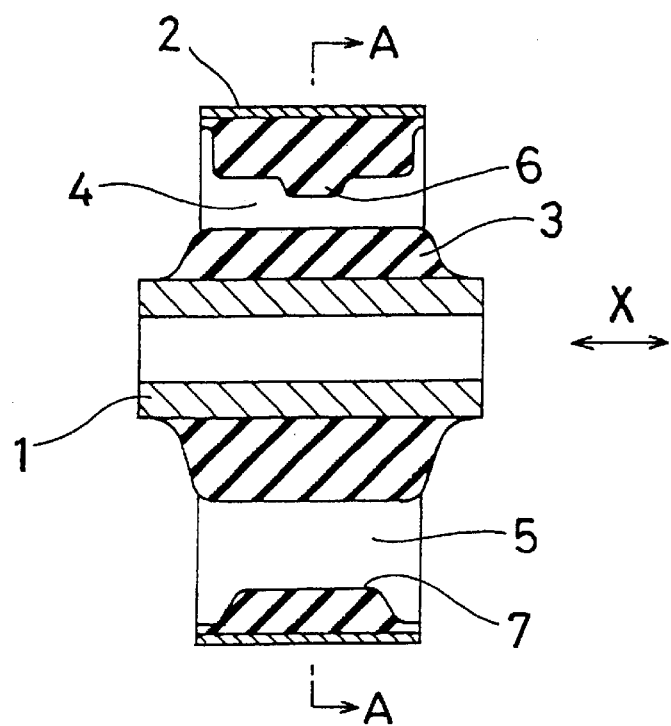
FIG. 2 is a longitudinal sectional view taken along the line B—B in FIG. 1.

The embodiments of this invention will be hereinafter described by way of examples with reference to the accompanying drawings.

The vibration-isolating device as illustrated is a case of vibration-isolating mount, which supports a power unit of automobile such as engine relative to the body side.

Referring to FIG. 1 to FIG. 4 relating to one example of the vibration-isolating device of this invention, an inner cylindrical fitting 1 having a relatively thick wall and an outer cylindrical fitting 2 disposed to surround its outside are connected unitedly by a rubber elastomer 3 interposed between both fittings. The rubber elastomer 3 is formed integrally by vulcanization molding and concurrently adhesively bonded to the inner cylindrical fitting 1 and the outer cylindrical fitting 2. Usually the outer cylindrical fitting 2 has a shorter dimension in the axial direction (X-direction) than that of the inner cylindrical fitting 1.

In the rubber elastomer 3 there are provided hollow spaces 4, 5 opposed to each other above and below the inner cylindrical fitting 1, the hollow spaces having respective required widths in the circumferential direction. Lateral (right-and-left) portions 3a, 3b of the rubber elastomer 3 between the upper and lower hollow spaces 4,5 are adapted to support the inner cylindrical fitting 1 relative to the outer cylindrical fitting 2.

The upper and lower hollow spaces 4, 5 are made circumferentially larger in width, in the cross-section square to the axial direction, than the outside diameter of the inner cylindrical fitting 1. Between the upper and lower hollow spaces 4,5, the lateral portions 3a, 3b of the rubber elastomer 3, which are elongated in the axially square direction (mainly the fore-and-aft direction, serve to support, as support arms, the inner cylindrical fitting 1 at a nearly central position relative to the outer cylindrical fitting 2.

As shown in FIG. 1 the upper hollow space 4 is made somewhat more extensive than the lower hollow space 5, and in the rubber elastomer 3, its lateral portions 3a, 3b as support arms are deviated toward a little the lower side than the middle of the up-and-down direction relative to the inner surfaces on fore-and-aft and right-and-left sides of the outer cylinder 2 and bonded to it, while its central portion bulges upwardly to assume a raised form. The inner cylindrical fitting 1 fixed to the central portion of the rubber elastomer 3 is, under no loading condition, eccentrically arranged upwards relative to the outer cylindrical fitting 2 so that under a condition where a predetermined load of a power unit, etc. is loaded, the inner cylindrical fitting 1 is supported substantially concentrically with the outer cylindrical fitting 2 as shown in the dash lines in FIG. 1 so as to retain predetermined clearances up and down.

On the outer cylindrical fitting 2 sides of the upper and lower hollow spaces 4,5, protuberant stopper rubber portions 6, 7 having a predetermined thickness are provided integrally by vulcanization molding of the same rubber as the rubber elastomer 3 so that upon inputting of vertical vibration to the inner cylindrical fitting 1 due to a large vibrational amplitude in excess of a definite value, the rubber elastomer 3 located above and below the inner cylindrical fitting 1 abuts on the stopper rubber portions to restrain the movement.

At the lateral portions 3a, 3b of the rubber elastomer 3, there are further provided small vacancies 8, 8 respectively at distant positions inboard from the outer cylindrical fitting 2, preferably in the vicinity of the midpoint between the inner and outer cylindrical fittings 1, 2.

Figure 5:
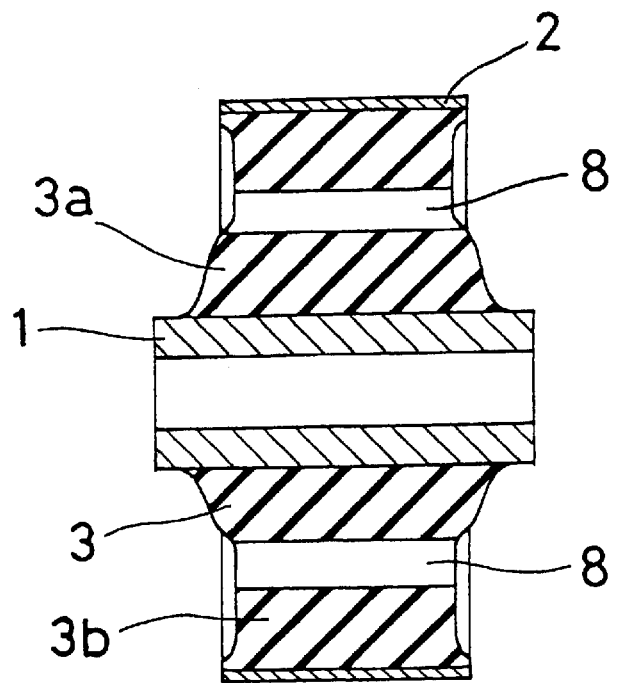
FIG. 5 is a sectional view similar to FIG. 3 showing another example of vibration-isolating device of this invention.

The small vacancies 8, 8 are of holes of circular form in the axial direction. In particular, they may be in the form of non-through-holes in the axial direction with non-pierced portion 8a remaining as shown in FIG. 3 or axially through-holes as shown in FIG. 5.

Figure 3:
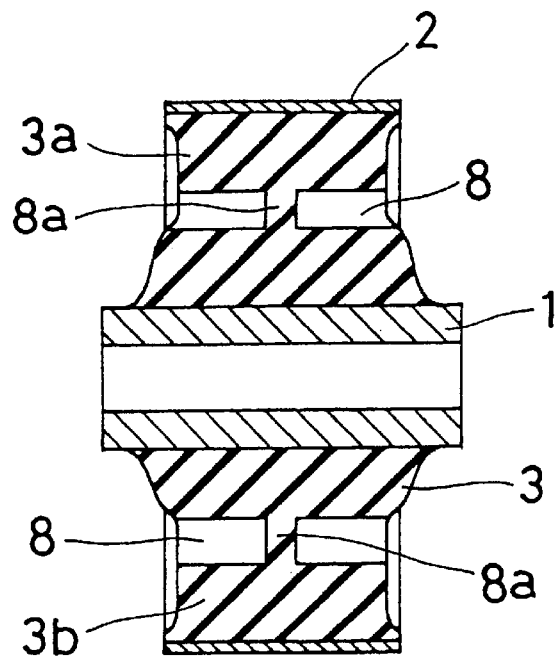
FIG. 3 is a sectional view taken along the line C—C in FIG. 1.
Figure 4:
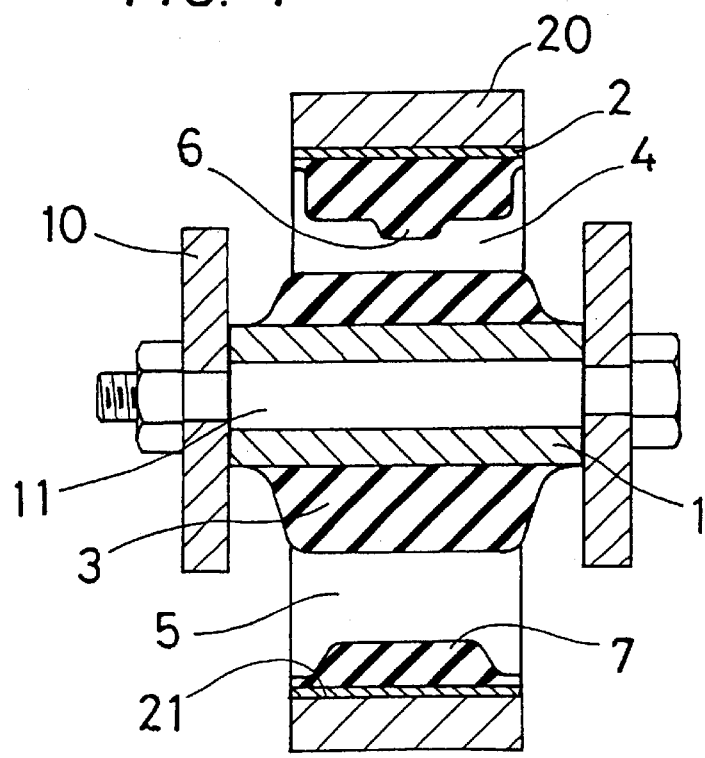
FIG. 4 is a similar sectional view to FIG. 2 showing the vibration-isolating device in the mounted state on a support component.

In the case of small vacancies 8 by non-through-holes, they are formed so that the non-pierced portion 8a may be located in the axially middle position as illustrated in FIG. 3, or otherwise the non-pierced portion may be located at axially one end or its vicinity.

Figure 6:
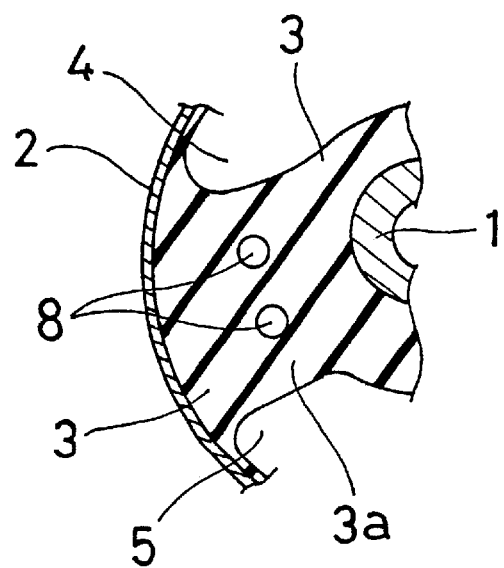
FIG. 6 is a partial sectional view showing another example of small vacancies.
Figure 7:
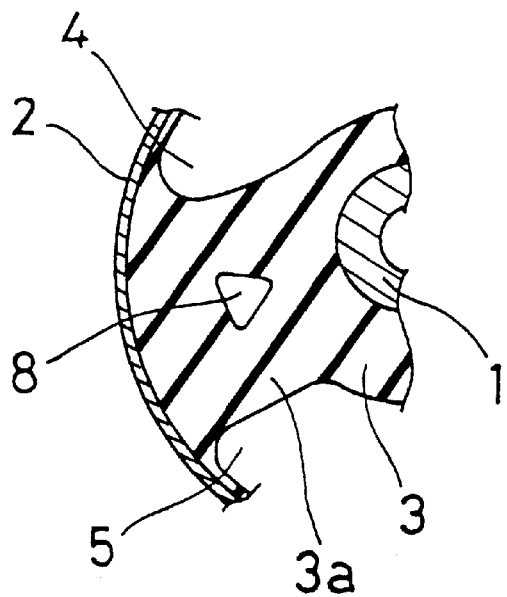
FIG. 7 is a partial sectional view showing further example of small vacancies.
Figure 8:
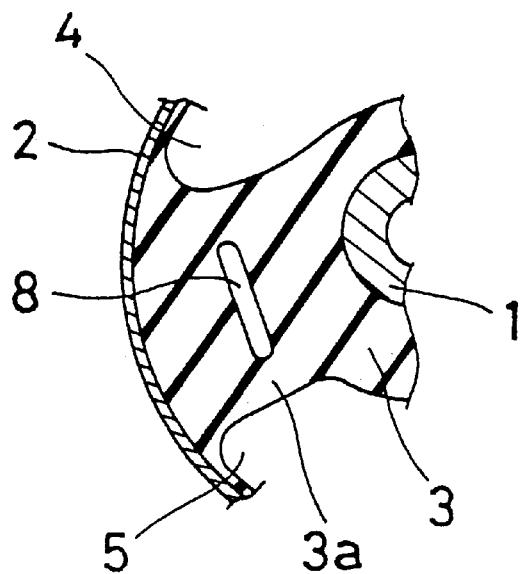
FIG. 8 is a partial sectional view showing still further example of small vacancies.

Each small vacancy 8, either non-through-hole or through-hole, can be varied with respect to its diameter, sectional form, size, depth and number depending on the rigidity, dynamic spring rate, etc. required. For example, it is possible to juxtapose, as shown in FIG. 6, a plurality of holes 8 as a vacancy (two holes in FIG. 6) at a required distance. Or it is possible to arrange a round hole of generally triangular form in cross-section as shown in FIG. 7 or a flat hole in cross-section as shown in FIG. 8 or a combination of them. Further in either case of non-through-hole or through-hole, the hole does not necessarily extend in the same shape and in the same diameter from the open end toward the axially inboard, but its diameter and shape may be changed axially.

In either case whether the small vacancy 8 is axially non-through-hole or axially through-hole, it is possible to conduct the tuning of rigidity more easily in comparison with the case where the lateral portions 3a, 3b of the rubber elastomer 3 as support arms have no small vacancies. In particular, in case where the small vacancies are non-through-holes, the rigidity is set higher than the case of through-holes, because of the existence of non-pierced portion 8a, and the diameter and the depth of the non-through-hole, namely, the wall thickness of the non-pierced portion 8a can be adjusted and altered, thereby making it possible to facilitate tuning. Therefore the design freedom is expanded.

The small vacancies 8 can be made, for instance, when the rubber elastomer 3 is vulcanization molded while being inserted between the inner and the outer cylindrical fittings 1, 2, using a core, as is the case with the upper and lower hollow spaces 4, 5. Otherwise after vulcanization molding it is also possible to bore the corresponding portions to the small vacancies. At any rate small vacancies can be provided in a simple and easy working process.

The vibration-isolating device described above is used by fixing with the inner cylindrical fitting 1 attached to the one support member 10 through a shaft member 11 while with the outer cylindrical fitting 2 press fitted into an attachment hole 21 of the other support member 20 such as bracket. Usually, the support member 10 is provided on the vibration source side such as power unit and the other support member 20, on the vehicle body side.

In this manner the device is used in a manner restraining the vibration of the power unit in the fore-and-aft direction with the axial direction (X-direction) oriented in the lateral direction to the vehicle. By axially providing the small vacancies 8 at the lateral portions 3a, 3b as support arms of the rubber elastomer 3, in this use, the spring in the lateral direction becomes softer against the vibration at amplitude smaller than a definite amplitude at which the small vacancies 8 have been broken down. Consequently it is possible to lower the dynamic spring rate in the fore-and-aft direction, which is lateral direction square to the axial direction and to improve the vibration-isolating characteristics in the fore-and-aft direction without changing the form of the hollow spaces 4,5 and the configuration of the lateral portions 3a, 3b and without affecting the dynamic spring rate and the vibration-isolating characteristics in the fore-and-aft direction.

Again on account of the position of the small vacancies 8 that they are provided at a distant position from the outer cylindrical fitting 2, in particular in the vicinity of the midpoint between the inner and outer cylindrical fittings 1, 2, it is possible to restrain the heat generation in the vicinity of the midpoint, where compressive and tensile movements due to the input of vibrational load in the fore-and-aft direction are large and heat is most liable to be evolved, effectively by heat dissipation effect of the small vacancies 8. With a plurality of holes as in FIG. 6 and a flat hole in section as in FIG. 8, heat dissipation effects of them are larger. For this reason, the deterioration in durability can be prevented.

Figure 9:
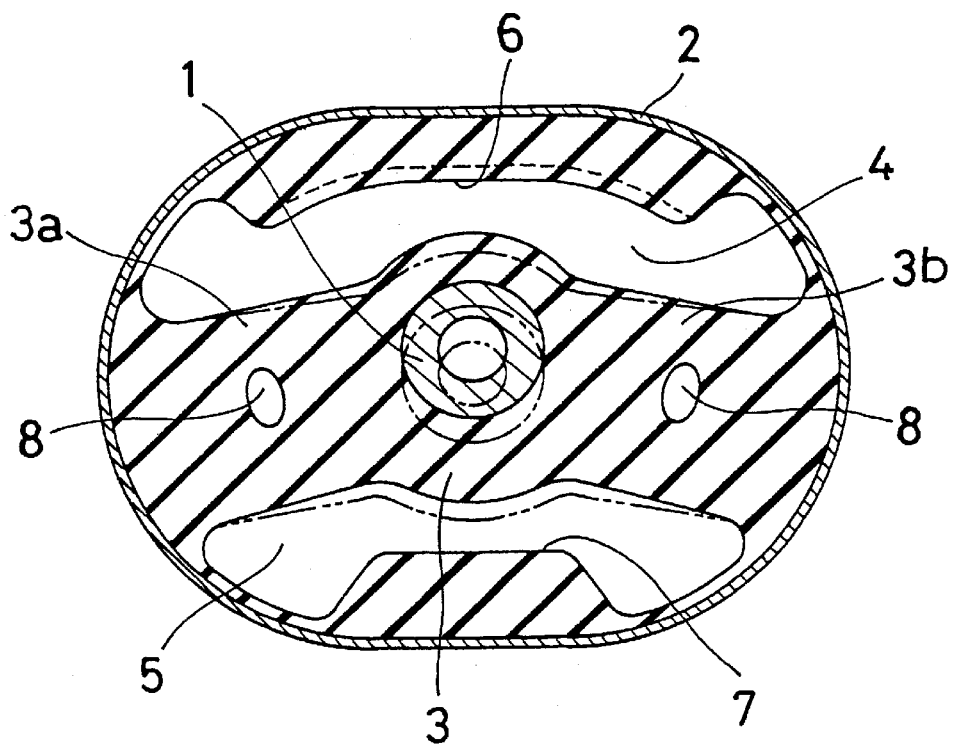
FIG. 9 is a sectional view of further example of a vibration-isolating device of this invention showing the outer cylindrical fitting formed as generally ellipsoidal form.
Figure 10:
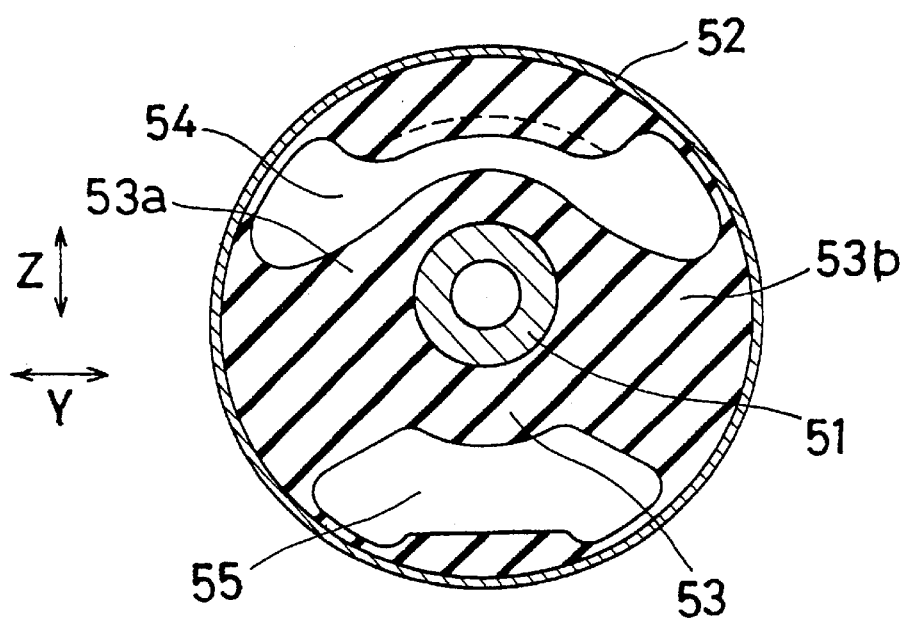
FIG. 10 is a longitudinal sectional view, similar to FIG. 1, exemplifying a conventional vibration isolator.

Although in the aforementioned example, the outer cylindrical fitting 2 assuming a generally circular form at the front side is indicated, another example shown in FIG. 9 is also possible where the outer cylindrical fitting 2 is of a generally ellipsoidal form, laterally long in cross-section, namely a generally ellipsoidal form whose long axis is the fore-and-aft direction (Y-direction).

In this example its fundamental construction is essentially the same as that of the example described above wherein the outer cylindrical fitting 2 is a circular form, and like elements designate like numerals.

That is, in the rubber elastomer 3 between the inner cylindrical fitting 1 and the outer cylindrical fitting 2, hollow spaces 4, 5 having circumferentially a predetermined width are provided in opposed manner above and below the inner cylindrical fitting 1 so that the rubber elastomer between the hollow spaces 4, 5 constitute lateral portions 3a, 3b as support arms, which support the inner cylindrical fitting 1 to the outer cylindrical fitting 2.

Further, as shown in FIG. 9, the upper hollow space 4 is likewise formed somewhat more extensive than the lower hollow space 5 and the central part of the rubber elastomer 3 assumes a raised form, bulging upwardly. The inner cylindrical fitting 1 fixed to the central part of the rubber elastomer 3 is, under no loading, arranged eccentric upwardly to the outer cylindrical fitting 2 so that under the loading state of a predetermined load such as power unit, the inner cylindrical fitting 1 is nearly concentrically supported with the outer cylindrical fitting 2 as shown in dot-dash lines in FIG. 9.

In the supporting state above, it is also possible to construct so that the ceiling surface at the lower hollow space 5 may abut on the raised stopper rubber portion 7 defining the lower hollow space 5 on the outer cylindrical fitting 2 side, although this state is not shown.

At the lateral portions 3a, 3b of the rubber elastomer 3 there are provided axially small vacancies 8, 8 of non-through-holes or through-holes, which are located each at a slightly distant place inboard from the outer cylindrical fitting 2, preferably in the vicinity of the midway between the inner and outer cylindrical fittings 1, 2. It is likewise possible to vary the small vacancies 8 as is the case with the preceding example.

Also in this example it is possible to lower the dynamic spring rate in the lateral direction square to the axial direction, without the necessity of changing the profile of the upper and lower hollow spaces 4, 5 and the configuration of the lateral portions 3a, 3b and without affecting the dynamic spring rate and vibration-isolating characteristics in the vertical direction. Consequently, for instance when used with the axial direction oriented in the lateral direction, vibration isolation characteristics in the fore-and-aft direction can be improved. Moreover the heat dissipation effect of the small vacancies 8 can restrain effectively the heat build-up in the vicinity of the midway where heat is most prone to be evolved by large compressive and tensile movements due to the input of vibrational load in the lateral direction square to the axial direction.

The vibration-isolating device of this invention can be used with the axial direction oriented in the fore-and-aft direction of the vehicle body, either. In this case, it is possible to lower the dynamic spring rate in the lateral direction.

As described above, according to the vibration-isolating device of this invention, it is possible not only to lower easily the dynamic spring rate in the lateral direction square to the axial direction without the necessity of changing the vibration-isolating characteristics in the vertical direction, without deteriorating the durability, but also to facilitate the tuning of rigidity. Hence this is useful and suitable mainly for engine mounts or suspension bushings for automobiles.

What is claimed is:

1. Vibration-isolating device comprising:

an inner cylindrical fitting, an outer cylindrical fitting disposed outwards to surround the inner cylindrical fitting, a rubber elastomer interposed between and connecting the inner and outer cylindrical fittings, the rubber elastomer being adjacent the entire inner surface of the outer cylinder, the rubber elastomer having therein circumferentially upper and lower hollow spaces defined above and below the inner cylindrical fitting, the upper and lower hollow spaces having a width, in a cross-section square to the axial direction, larger than an outside diameter of the inner cylindrical fitting, the hollow spaces being defined at their entire circumferences by the rubber elastomer, the rubber elastomer which extends between the upper and lower hollow spaces constituting lateral portions, the lateral portions of the rubber elastomer supporting the inner cylindrical fitting to the outer cylindrical fitting, the rubber elastomer consisting entirely of a rubber elastomer material without including metallic members or other members of different material from the rubber elastomer, and the rubber elastomer extending from a first point proximate a first end of the inner cylinder to a second point proximate a second end of the inner cylinder, and surrounding and contacting an entire outer surface of said inner cylinder between the first point and the second point, wherein particular portions of the rubber elastomer that are opposed to the lateral portions via the hollow spaces constitute stoppers and the lateral portions of the rubber elastomer have small vacancies defined at a distant position inboard from the outer cylindrical fitting.

2. The vibration-isolating device as set forth in claim 1, wherein the small vacancies are provided in the lateral portions of the rubber elastomer in the vicinity of the midpoint between the inner and outer cylindrical fittings.

3. The vibration-isolating device as set forth in claim 1, wherein the small vacancies are axial non-through-holes.

4. The vibration-isolating device as set forth in claim 1, wherein the small vacancies are axial through-holes.

5. The vibration-isolating device as set forth in claim 1, wherein the lateral portions of the rubber elastomer have respectively a plurality of small vacancies.

6. The vibration-isolating device as set forth in any one of claims 1 to 5, wherein the inner cylindrical fitting is arranged to be upwardly eccentric relative to the outer cylindrical fitting under non-loading state so as to be supported nearly concentrically with the outer cylindrical fitting under a predetermined load.

7. The vibration-isolating device as set forth in any one of claims 1 to 5, wherein the outer cylindrical fitting has a laterally elongated ellipsoidal shape in cross-section and the lateral portions of the rubber elastomer support the inner cylindrical fitting from both sides in cross-section of the outer cylindrical fitting.

8. The vibration-isolating device as set forth in claim 6, wherein the outer cylindrical fitting has a laterally elongated ellipsoidal shape in cross-section and the lateral portions of the rubber elastomer support the inner cylindrical fitting from both sides in cross-section of the outer cylindrical fitting.

* * * * *